United States Patent [19]

Hale et al.

[11] Patent Number: 5,464,060
[45] Date of Patent: Nov. 7, 1995

[54] UNIVERSAL FLUIDS FOR DRILLING AND CEMENTING WELLS

[75] Inventors: Arthur H. Hale, Houston; Kenneth M. Cowan, Sugar Land; James J. W. Nahm, Houston, all of Tex.

[73] Assignee: Shell Oil Company, Houston, Tex.

[21] Appl. No.: 266,748

[22] Filed: Apr. 12, 1994

Related U.S. Application Data

[63] Continuation of Ser. No. 886,533, May 20, 1992, abandoned, which is a continuation-in-part of Ser. No. 751,399, Aug. 28, 1991, abandoned, and Ser. No. 691,905, Apr. 26, 1991, abandoned, said Ser. No. 751,399, is a division of Ser. No. 671,627, Mar. 19, 1991, Pat. No. 5,085,679, which is a continuation-in-part of Ser. No. 641,794, Jan. 16, 1991, abandoned, which is a continuation-in-part of Ser. No. 457,429, Dec. 27, 1989, abandoned.

[51] Int. Cl.$^6$ .................................................. E21B 33/138
[52] U.S. Cl. ........................ 166/293; 166/292; 166/300; 175/65
[58] Field of Search ............................... 166/292, 293, 166/300; 175/64, 65; 106/790

[56] References Cited

U.S. PATENT DOCUMENTS

| | | |
|---|---|---|
| 2,621,132 | 12/1952 | Saal . |
| 2,649,160 | 8/1953 | Williams et al. . |
| 2,705,050 | 3/1955 | Davis et al. . |
| 2,822,873 | 2/1958 | Harmsen et al. . |
| 3,022,824 | 2/1962 | Binkley et al. . |
| 3,071,481 | 1/1963 | Beach et al. . |
| 3,168,139 | 2/1965 | Kennedy et al. . |
| 3,499,491 | 3/1970 | Wyant et al. ............................ 166/292 |
| 3,557,876 | 1/1971 | Tragesser ............................... 166/292 |
| 3,605,898 | 9/1971 | Harrison et al. ........................ 166/293 |
| 3,615,785 | 10/1971 | Moorer et al. . |
| 3,887,009 | 6/1975 | Miller et al. ............................. 166/292 |
| 3,920,466 | 11/1975 | Danjushevsky et al. ................ 166/292 |
| 3,921,717 | 11/1975 | Danjushevsky et al. . |
| 3,936,408 | 2/1976 | Adams et al. . |
| 3,964,921 | 6/1976 | Persinki et al. ....................... 166/293 X |
| 3,990,903 | 11/1976 | Mallow ................................ 166/292 X |
| 4,011,909 | 3/1977 | Adams et al. ........................... 166/293 |
| 4,040,854 | 8/1977 | Persinski et al. . |
| 4,053,323 | 10/1977 | Adams et al. . |
| 4,095,987 | 6/1978 | Walker ................................ 166/293 X |
| 4,114,692 | 9/1978 | Gallus .................................... 166/293 |
| 4,176,720 | 12/1979 | Wilson ................................... 166/293 |
| 4,200,153 | 4/1980 | Gallus .................................... 166/292 |
| 4,252,193 | 2/1981 | Powers et al. .......................... 166/292 |
| 4,299,516 | 11/1981 | Miyoshi et al. ........................ 405/266 |
| 4,312,405 | 1/1982 | Wilder ................................... 166/285 |
| 4,519,452 | 5/1985 | Tsao et al. .............................. 166/288 |
| 4,584,327 | 4/1986 | Sutton ................................ 166/292 X |
| 4,674,572 | 6/1987 | Gallus .................................... 166/285 |
| 4,676,832 | 6/1987 | Childs et al. ........................ 166/293 X |
| 4,780,220 | 10/1988 | Peterson ............................... 252/8.551 |
| 4,802,998 | 2/1989 | Mueller et al. . |
| 4,883,125 | 11/1989 | Wilson et al. .......................... 166/291 |
| 4,953,620 | 9/1990 | Bloys et al. . |
| 4,997,487 | 3/1991 | Vinson et al. . |
| 5,004,506 | 4/1991 | Allen et al. . |
| 5,005,646 | 4/1991 | Bloys et al. ............................. 166/293 |
| 5,016,711 | 5/1991 | Cowan ................................... 166/250 |
| 5,035,813 | 7/1991 | Shen ..................................... 252/8.551 |
| 5,058,679 | 10/1991 | Hale et al. .............................. 166/293 |

*Primary Examiner*—George A. Suchfield

[57] ABSTRACT

A universal fluid which includes a water-based drilling mud and a hydraulic material is used to drill a borehole and lay down settable filter cake. After drilling is completed, the filter cake and universal fluid are caused to solidify in selected parts of the borehole by admixing the universal fluid with an activator.

8 Claims, No Drawings

UNIVERSAL FLUIDS FOR DRILLING AND CEMENTING WELLS

RELATED APPLICATIONS

This application is a continuation of application Ser. No. 886,533 filed May 20, 1992, abandoned, which is a continuation-in-part of application Ser. No. 751,399 filed Aug. 28, 1991, abandoned, and application Ser. No. 691,905 filed Apr. 26, 1991, abandoned. Application Ser. No. 751,399 is a division of application Ser. No. 671,627 filed Mar. 19, 1991, now U.S. Pat. No. 5,085,679, which is a continuation-in-part of application Ser. No. 641,794 filed Jan. 16, 1991, abandoned, which is a continuation-in-part of application Ser. No. 457,429 filed Dec. 27, 1989, abandoned.

BACKGROUND OF THE INVENTION

1. Field of the Invention

The present invention pertains to improvements in compositions and methods for zonal isolation for vertical, deviated, and horizontal oil and gas wells. The method involves the utilization of universal fluids for providing settable filter cake while drilling and the subsequent in-situ solidification of the universal fluids to compressive strengths well in excess of that required for casing support, zonal isolation, and borehole stability.

2. Description of Prior Art

The general procedure of drilling an oil or gas well includes drilling a borehole using a drilling fluid. Subsequent to drilling the borehole, casing is run into the well preparatory to placing a cement slurry in the annulus between the outside of the casing and the borehole wall. In order to obtain a good cementing job, it is necessary to displace substantially all of the drilling fluid or mud in the annulus with cement. This necessity arises from the fact that undisplaced mud and filter cake become the source of unsuccessful cement jobs since drilling fluids and cements are usually incompatible. Thus, most water base muds will either cause instant setting of the cement or act as a retarder of the cement setting that can adversely affect the strength of the cement. On the other hand, most cements will flocculate and thicken most water base muds. As the cement is pumped out of the bottom of the casing and up the annulus, it may form flow channels through blocking sections of flocculated drilling mud. In addition, undisplaced filter cake can prevent cement from bonding to the formation and becomes the source of the flow channels.

The drilling industry has sought to overcome the above problems by using a variety of techniques to displace the drilling fluid with cement, e.g., utilization of turbulent flow regimes, casing movement (reciprocal/rotation), casing equipment (centralizers, flow diverters, and mud scratchers) spacers and special wash fluids while cementing, but these have had limited success. Even greater cementing difficulties are encountered with high-angle bore holes, with major problems arising in connection with running casing, drilled solids, settling of solids, displacement of mud, centralization of casing, and cement slurry free water. When a poor cementing job results due to these problems, it may be necessary to perforate the casing and squeeze cement under high pressure through the perforations into the annulus and try to fill the zones that were not properly cemented initially. Frequently, squeeze cementing is not successful, and such failure may eventually lead to abandoning the hole.

Accordingly, the present invention is directed to overcoming the above noted problems in the art and provides a solution thereto as more particularly described hereinafter.

SUMMARY OF THE INVENTION

It is the primary purpose of the present invention to provide compositions for "universal fluids" which can be used as drilling muds and methods for subsequent in-situ solidification of the universal fluids.

The purpose of the invention is achieved through a method for drilling and cementing a well, comprising preparing a universal fluid by admixing a well fluid or drilling mud with a hydraulic material; drilling a borehole with the universal fluid and laying down a settable filter cake on the walls of said borehole during drilling of the well; and activating the filter cake to harden and set up.

A composition is provided for use in drilling and cementing a well, comprising the product of a drilling mud admixed with a hydraulic material which produces a universal fluid suitable for drilling a borehole and laying down a settable filter cake on the walls of said borehole; and an activator admixable with or contacting the filter cake, the activator being functional to cause the filter cake to harden and set up. A preferred way of applying the activator is to conduct a normal cement job with a cement or mud-concrete slurry which carries the activator. The activator may also be admixed with a mud, a spotting fluid, or a pill, and the resulting fluid may be spotted or circulated through the annulus prior to cementing. The activator is subsequently filtered (diffused) through the filter cake and causes it to set hard.

The advantages realized by the present invention include the following: (1) a universal fluid is functionally and rheologically suitable as a drilling fluid; (2) the settable filter cake layed down by the universal fluid hardens to a relatively high compressive strength, for example, about 3,500 psi; (3) improved zonal isolation is achieved by the settable filter cake which bonds to the formation and the cementing medium; (4) the bond between the hardened filter cake and the cementing medium is very strong; and (5) it is not necessary either to displace mud or to remove the mud filter cake when a universal fluid is used as a drilling fluid in a well.

Other purposes, distinctions over the art, advantages and features of the invention will be apparent to one skilled in the art upon review of the following.

DESCRIPTION OF PREFERRED EMBODIMENTS

The following preferred embodiments of the invention, together with the following examples, explain the principles of the invention.

Major cementing problems encountered in high angle or horizontal wells are (1) drilled cuttings and mud solids causing difficulties with running casing, (2) settling of the solids on the bottom of the borehole and forming flow channels in the cemented annulus, (3) the tendency of the casing to lie on the lower side of the wellbore due to high borehole angles, and (4) free-water separation on the upper side of the borehole resulting in poor cementing jobs through the formation of flow channels. The universal fluid of the present invention easily can lay down a filter cake all around on the borehole walls while drilling. A major benefit from the universal fluid is improved zonal isolation (hydraulic and shear bonds, etc.) through a hardened filter cake regardless of the borehole angles. Other important aspects of the universal fluid are that it eliminates the displacement step during cementing; it eliminates many problems associated with cementing high angle/horizontal wells; and it is a zero free-water system.

The universal fluid is prepared by treating a well fluid or mud with a hydraulic material (e.g., Class A cement, Type F fly ash, natural pozzolan, and/or slag). The universal fluid becomes a drilling fluid, highly suitable for use in any vertical, highly deviated, extended reach or horizontal wellbore, and then deposits a settable filter cake under downhole conditions. The universal fluid is converted to mud-concrete at the end of drilling by adding additional hydraulic material and an activator such as sodium silicate, thus triggering it to set up.

UNIVERSAL FLUID CLASSIFICATION

Readily and economically available hydraulic materials include Portland cement, natural pozzolanic material, flyash, ground blast furnace slag, etc. As listed in Table 1, four types of universal fluid (UF) with different combinations of hydraulic materials are possible. Type I universal fluid (PC-Mix) is formulated with Portland cement and a pozzolanic material, such as Halliburton's "POZMIX A" (Type F flyash by Halliburton) or "DIAMIX A" (Type N mined pozzolan by BJ). However, a number of other combinations of hydraulic materials are possible in formulating a universal fluid. Type II, III and IV universal fluids are alternatives to Type I. Type IV is prepared with only slag.

TABLE 1

| UNIVERSAL FLUIDS CLASSIFICATION | | |
| --- | --- | --- |
| Universal Fluid Type | Hydraulic Materials for Filter Cake Setting | Conversion/ Preferred Activators for UFs |
| Type I | Portland Cement Pozzolan | C-Mix/HTC-Mix Sodium Silicates |
| Type II | Portland Cement Slag Pozzolan | C-Mix/HTC-Mix Sodium Silicate Alkalies |
| Type III | Portland Cement Slag | C-Mix/HTC-Mix/S-Mix Sodium Silicates Alkalies |
| Type IV | Slag | C-Mix/HTC-Mix/S-Mix Portland Cement Alkalies Sodium Silicates |

Type IV has many advantages over Type I. First of all, Type IV is very simple to prepare, and it is readily managed as a drilling fluid. Its filter cake can be activated to set in a number of ways. Conversion of Type IV yields a high temperature C-Mix(HTC-Mix) or S-Mix. These advantages are realized due to the fact that the rate of hydration of a slag in water is much slower than that of Portland cement. Water soluble sodium silicates and common alkalies are good activators or setting agents for all Universal Fluid types shown in Table 1.

HTC-Mix is a high temperature version of C-Mix which is prepared by adding either or a combination of about 10 to 60 wt % blast furnace slag (basis total HTC-Mix) or 10 to 60 wt % powdered glass (basis total HTC-Mix) to the C-Mix. A new class of formulation designated as S-Mix is prepared by adding about 100 wt % blast furnace slag (basis total S-Mix) to a water-base mud and one or more alkaline or other activating agents.

The term blast furnace slag refers to the refuse from the melting of metals or reduction of ores in a furnace. Most notably, blast furnace slag is a by product of the manufacture of steel in a blast furnace. In steel making, the blast furnace slag is discharged from the furnace as a molten stream at a temperature typically between 1400° C. and 1600° C. Rapid quenching of this slag results in its conversion into a material which has hydraulic properties. The rapid quenching of the slag converts it into a glassy state and it is generally recognized that the hydraulic quality of the slag depends upon the effectiveness of the process used to rapidly cool the slag and freeze it into the granulated, glassy state.

Silicon dioxides, aluminum oxides, iron oxides, calcium oxide, magnesium oxide, sodium oxide, potassium oxide, and sulfur are some of the chemical components in slags. The actual presence and/or amounts of these components varies since the optimum furnace operations may vary with the metals or ores being processed. Hence, there is seldom any significant flexibility to adjust the chemical composition of the slag to improve hydraulicity.

However, since the quenching process directly influences the hydraulicity, determination of hydraulic properties through chemical analysis has limited value. Two slags having the same general chemical composition can have significantly different hydraulicity due to the quenching process and its effectiveness. The glass content of slags increases with the rate of cooling and water cooling typically produces a very high cooling rate. Air cooling often produces slags with various levels of glass content due to differences in cooling rates. Smaller particles have a higher glass content due to faster cooling while the larger particles cool more slowly and have a lower glass content. Therefore, the selection of a cementitious blast furnace slag for this invention is best determined by a direct performance (strength) test of the slag mixed with water to evaluate the slag's hydraulicity.

The preferred blast furnace slag of the invention is a high glass content slag produced by quickly quenching the molten slag through intimate contact with large volumes of cool water. Slags produced by air quenching may be used in the invention provided they are determined to have cementitious properties. However, they are less desirable. The fineness of the slag should be between about 2000 cm$^2$/g and 15,000 cm$^2$/g and more preferably between 3000 cm$^2$/g and 9000 cm$^2$/g and most preferably between 4000 and 6500 cm$^2$/g. A commercially available blast furnace slag which fulfills the requirements of the new invention is marketed under the trade name NEWCEM by the Blue Circle Atlantic Company. This slag is obtained from the Bethlehem Steel Corporation blast furnace at Sparrows Point, Md.

Well fluids or drilling muds suitable for use with the invention include a water base mud, a fresh water mud, a seawater mud, a salt mud, a brine mud, a lime mud, a gypsum mud, a polymer mud, an oil mud, a non-toxic mineral oil mud, an invert oil mud, an emulsion mud, and a polyalcohol mud.

An activator(s) is needed to trigger setting of the mud cements of the present invention. Selection of type and concentration of an activator(s) largely depends on the nature of the drilling fluids and the universal fluid composition. Suitable activators include sodium silicate, sodium fluoride, sodium silicofluoride, magnesium silicofluoride, zinc silicofluoride, sodium carbonate, potassium carbonate, sodium hydroxide, potassium hydroxide, calcium hydroxide, sodium sulfate, and mixtures thereof. Water soluble sodium silicates are good activators or setting agents for all types shown in Table 1. The setting of types II, III, and IV universal fluids containing slag may be controlled by adding alkaline materials, sodium silicates or sodium sulfate.

Hydraulic materials, e.g., Portland cement, fly ash, natural pozzolan, trass, tuff, blast furnace slag, and mixtures thereof, used in accordance with the present invention, can be retarded or activated, depending on mixing energy, temperature, retarder and activator used, and the physical state required of the materials. Wood sugar, for example, is a useful retarder, which may be present in lignosulfonates. Other preferred retarders or dispersants include sulfonated styrene maleic anhydride (SSMA) copolymers such as those disclosed in U.S. Pat. No. 4,883,125, lignosulfonate, chrome-free lignosulfonate, lignite, sulfonated lignite, sulfomethylated humic acid, napthalene sulfonate, a blend of polyacrylate and polymethacrylate, an acrylamideacrylic acid copolymer, a phenol sulfonate, a napthalene sulfonate, dodecylbenzene sulfonate, and mixtures thereof.

The teaching of U.S. Pat. No. 3,499,491 (Wyant et al) is incorporated hereinto by reference thereto. Wyant et al teaches the combination of a drilling fluid with a cementitious mixture comprising hydraulic cement and powdered sodium silicate glass to form a mud-concrete (so-called C-Mix). The increased temperature of the borehole triggers the setting action of the mud-concrete.

Table 2 lists the dry blended C-Mix components on a weight percent basis which make up a cementing medium, e.g., composition to be added to a base drilling mud to form a species of the universal fluid:

TABLE 2

CHEMICAL COMPOSITION FOR A C-MIX

| Component | Weight Percent |
|---|---|
| Class A cement | 65.5 |
| Type F fly ash* | 14.0 |
| Dense soda ash | 3.5 |
| "SS-C200"** | 17.0 |

*exemplified by "POZMIX" A, a tradename of Halliburton for Type F fly ash.

**tradename of PQ Corporation for sodium silicate.

ps-Mix Examples

C-Mix slurries remain fluid for a long period of time when activating ingredients such as sodium silicate, are not present. Basically, Type I universal fluid (see Table 1) is the above C-Mix composition minus sodium silicate. As an example, the activator, e.g., sodium silicate, is primarily responsible for early strength development by reacting with reactive sites of clays and Class A cement particles in the cementing medium (e.g., C-Mix) fluids.

The universal fluid (Type I, Table 1) containing the above components sets hard under downhole conditions when an activator, e.g., sodium silicate, is added to it. In practice, a universal fluid can act as a drilling fluid, and the activator can then be added to the circulating universal fluid prior to cementing to enable it to harden in-situ to a high strength mud-concrete.

Data indicating that universal fluids, UF-1, and UF-2, can be circulated for extended periods are listed in Table 3. The rhealogical properties of the UF-1 and UF-2 before and after circulation at 100° F. demonstrate usefulness as drilling fluids. Two standard C-Mix slurries, U-1 and U-2, which were prepared by adding 200 lb/bbl C-Mix powder as listed in Table 2 to a WLV (West Lake Verret) gypsum lignosulfonate mud (see Table 4), indicate typical C-Mix slurry rheologies for this type of mud system. UF-3 was hot rolled in a roller oven for two days without the activator while UF-2 was hot rolled for 10 days without the activator, in order to demonstrate their fluid characteristics as drilling fluids.

TABLE 3

RHEOLOGICAL PROPERTIES OF PC-MIX FLUIDS

| Sample Description | Slurry Properties | | | |
|---|---|---|---|---|
| | PV | YP | Gels | pH |
| Base Mud-1 | 16 | 7 | 5/19 | 10.25 |
| U-1: BM-1 + 200 lb/bbl C-Mix (using "DIAMIX" A) | 48 | 25 | 6/54 | 11.75 |
| U-2: BM-1 + 200 lb/bbl C-Mix (using "POZMIX" A) | 42 | 27 | 6/46 | — |
| Base Mud-2 | 14 | 10 | 5/27 | 8.3 |
| UF-1: BM-2 + 131 lb/bbl Class A + 28 lb/bbl "DIAMIX" A + 7 lb/bbl Soda Ash | 42 | 29 | 15/82 | — |
| Above after circulation for 2 days | 47 | 16 | 4/21 | 10.25 |
| U-3: Above after adding 34 lb/bbl "SC-C200" | 52 | 16 | 4/21 | 12.0 |
| Base Mud-3 | 11 | 6 | 3/15 | 8.7 |
| UF-2: BM-3 + 131 lb/bbl Class A + 28 lb/bbl "DIAMIX" A + 7 lb/bbl Soda Ash | 31 | 23 | 8/56 | 11.7 |
| Above after circulation for 10 days | 35 | 10 | 3/17 | 12.0 |
| U-5: Above after adding 34 lb/bbl "SC-C200" | 39 | 11 | 3/16 | 11.9 |

Notes:

TABLE 3-continued

RHEOLOGICAL PROPERTIES OF PC-MIX FLUIDS

| | Slurry Properties | | | |
|---|---|---|---|---|
| Sample Description | PV | YP | Gels | pH |

1. Base mud was treated with 5.5 lb/bbl "SPERCENE" (trademark of MI Drilling Fluids for chrome lignosulfonate).
2. See TABLE 2.
3. Circulation -- Slurries were hot rolled at 100° F.
4. PV (plastic viscosity) in cp.
YP (yield point) in lb/100 ft$^2$.
Gels (10-sec/10-min) in lb/100 ft$^2$.
All other units used are U.S. traditional units.

TABLE 4

BASE MUD FORMULATIONS

| Ingredient | Per bbl |
|---|---|
| Test No. 1 - 9.5 lb/gal Diatomite Mud | |
| Water | 0.96 bbl |
| Bentonite | 12 lb |
| "CYPAN" (trademark of American Cynamide for sodium polyacrylate polymer) | 1 lb |
| Barite | 20 lb |
| "REVDUST" (trademark of Milwhite for simulated drill solids) | 45.5 lb |
| Test Nos. 2 and 3 9.5 lb/gal WLV Gyp Mud | |
| Water | 0.96 bbl |
| Bentonite | 12 lb |
| Starch | 1 lb |
| "DRISPAC SUPERLO" (trademark of Drilling Specialties for modified carboxymethyl-cellulose) | 0.5 lb |
| "REVDUST" (trademark of Milwhite for simulated drill solids) | 20 lb |
| Barite | 28 lb |
| Caustic soda | 0.5 lb |
| "TANNATHIN" (trademark of MI Drilling Fluids for lignite) | 2 or 4.0 lb |
| Gypsum (100% active) | 11.5 lb |

After hot rolling, the UF-1 and UF-2 fluids were treated with 34 lb/bbl of sodium silicate (SS-C200), and allowed to cure at 140° F. in a "UCA" cell (Halliburton's Ultrasonic Cement Analyzer designed to monitor cement compressive strength development against time).

Table 3 indicates that universal fluids (UF-1 and UF-2) have sufficiently low rheological properties to be used as drilling fluids for reasonable periods of time.

Commercial lignosulfonates are a preferred thinner for both C-Mix and universal fluid slurries. Other additives effective in thinning C-Mix and universal fluid slurries are synthetic thinners such as "SSMA" (sulfonated styrene maleic anhydride copolymer supplied by Milchem). Table 5 lists the rheological properties of a laboratory prepared universal fluid with different thinners. Small concentrations of "EX0-314" (trademark of Petrolite for composition comprising polyacrylate polymer and sulfonated styrene maleicanhydride copolymer) are very effective in thinning universal fluids.

TABLE 5

EVALUATION OF THINNERS IN A PC-MIX FLUID

| | Fluid Properties | | |
|---|---|---|---|
| PC-Mix Fluids | PV | YP | Gels |
| 9.5 lb/gal Diatomite mud | 17 | 6 | 2/3 |
| Base Mud + 200 lb/bbl equivalent PC-Mix | 21 | 4 | 2/5 |
| Above after stirring 4 days | 40 | 29 | 18/41 |
| Above hot rolled at 120° F. | 47 | 37 | 18/34 |
| Above weight cut back by 0.1 lb/gal[1] | 33 | 20 | 12/31 |
| Above PC-Mix + 2 lb/bbl "SPERCENE" CF | 40 | 23 | 16/35 |
| Above PC-Mix + 2 lb/bbl "EXO-314"[2] | 34 | 7 | 3/8 |
| Above PC-Mix + 2 lb/bbl "SSMA"[3] | 37 | 11 | 3/20 |

Notes:
[1]Weight cut back from 11.75 to 11.65.
[2]"EXO-314" - trademark of Petrolite Corp. for composition comprising polyacrylate polymer.
[3]"SSMA" - sulfonated styrene maleic-anhydride.
Class A cement, Type F fly ash, and dense soda ash.

Full-Scale Displacement Testing

The concept of a universal fluid was demonstrated in a full-scale test apparatus with the capability of allowing the formation of a filter cake in a realistic simulated borehole. Three full-scale displacement tests designated PC-Mix-1, -2, and -3 (Type I; Class A cement, and Type F fly ash) were conducted. The PC-Mix-1 test utilized a 9.5 lb/gal water-based Diatomite mud as the base fluid system. The PC-Mix-2 and -3 tests both utilized a 9.5 lb/gal water-base WLV (West Lake Verret) gypsum lignosulfonate mud as the base mud. Table 4 lists the components of these two water-base drilling fluid systems.

The 19-feet displacement model utilized 5-inch casing in a 6½-inch synthetic core. The bottom-hole circulating and static temperatures modeled were 120° F. and 200° F, respectively. The PC-Mix-1 and -2 tests were designed to have 100 percent standoff, while the PC-Mix-3 test had a low standoff (30 percent). Table 6 lists brief synopses of these-tests including the average casing standoffs recorded for the three tests.

TABLE 6

BRIEF SYNOPSES FOR PC-MIX FULL-SCALE TESTS

| PC-Mix-1: | 9.5 lb/gal Diatomite mud prepared |
|---|---|
| | 200 lb/bbl PC-Mix* fluid prepared |
| | PC-Mix fluid displaced with 250 lb/bbl C-Mix at 3 bbl/min |
| | C-Mix cured at 200° F. for three days at 76 percent standoff |
| | Separate batch of 200 lb/bbl PC-Mix circulated |
| PC-Mix-2: | 9.5 lb/gal WLV gyp mud (2 lb/bbl lignite) prepared |

TABLE 6-continued

BRIEF SYNOPSES FOR PC-MIX FULL-SCALE TESTS

|  |  |
|---|---|
| PC-Mix-3: | 200 lb/bbl PC-Mix* fluid prepared<br>25 lb/bbl Class A was added to control settling<br>PC-Mix fluid displaced with 250 lb/bbl C-Mix** at 3 bbl/min<br>C-Mix cured at 200° F. for eight days at 84 percent standoff<br>Separate batch of 200 lb/bbl PC-Mix fluid circulated<br>916 lb/gal WLV gyp mud (4 lb/bbl lignite) prepared<br>200 lb/bbl PC-Mix* fluid prepared/circulated six days<br>230 lb/bbl PC-Mix** fluid prepared from 200 lb/bbl PC-Mix<br>PC-Mix displaced with 250 lb/bbl C-Mix at 4.0 bbl/min pipe reciprocated while displacing<br>C-Mix cured at 200° F. for eight days at 37 percent standoff<br>Separate batch of 250 lb/bbl PC-Mix circulated |

*131 lb/bbl Class A + 28 lb/bbl "POZMIC" A + 7 lb/bbl Soda Ash.
**164 lb/bbl Class A + 35 lb/bbl "POZMIX" A + 8.75 lb/bbl Soda Ash.

Filter Cake Hardening

The present invention also demonstrates that a filter cake can be hardened in a borehole, thus improving zonal isolation. The filter cake of PC-Mix-1 was set hard within a few days, but it took longer for the other two cores (PC-Mix-2 and -3) to set hard. The set filter cake of PC-Mix-1 had a compressive strength of 2,500 psi (estimated from Brinell hardness) and was tightly bonded to the formation and to the set C-Mix.

The data collected on the hydraulic bond at the C-Mix/universal fluid filter cake interfaces are listed in Table 7. These hydraulic bond values ranged from 110–900 psi. The higher values (640–900 psi) seen in PC-Mix-1 were indicative of the almost 100 percent set material in the annulus achieved when using a Diatomite mud system.

TABLE 7

IN-SITU HYDRAULIC BOND TEST RESULTS[1]

| Test No. | Hydraulic Bond (psi) at Listed Tap[2] | | | | |
|---|---|---|---|---|---|
|  | 1 | 2 | 3 | 4 | 5 |
| PC-Mix-1 | 640 | 840 | 640 | 900 | 800 |
| PC-Mix-2 | 280 | 560 | 600 | 180 | 160 |
| PC-Mix-3 | 110 | 300 | 900 | 500 | 300 |

[1]Attempted to test seal of universal fluid filter cake.
[2]Tap locations from top: 1-90 in., 2-110 in., 3-130 in., 4-150 in., 5-170 in. on a displacement core.

The set filter cake plays a critical role in providing zonal isolation. In the narrow annular space, only thick filter cake is often present. If this filter cake had been an ordinary mud cake, the cement job would have been a failure due to poor mud displacement. The set universal fluid filter cake can provide the needed zonal isolation with good shear and hydraulic bond strengths.

Shear Bond Testing

After the hydraulic bond testing was completed, the remaining models were cut into 12 sections at spaced locations. Visual inspection demonstrated that the job performance was good.

Table 8 lists the recorded shear bond strengths obtained using laboratory shear bond molds prepared with the same PC-Mix materials. It appears from the shear bond data that the expansion reaction (between cement and gypsum) indeed helped the bonding within these molds. PC-Mix-1 results averaged 12 psi, while the WLV gyp mud C-Mix used in PC-Mix-2 and PC-Mix-3 resulted in 24.7 and 54.8 psi average shear bonds, respectively. Apparently, the additional aging (thus, applied shear) seen by the PC-Mix-3 fluid (five extra days) along with the 50 lb/bbl additional C-Mix chemicals (250 lb/bbl vs 200 lb/bbl) added to the PC-Mix-3 fluid contributed to the much increased shear bond values.

TABLE 8

SHEAR BOND TEST DATA
OBTAINED USING LABORATORY SHEAR BOND MOLDS

| Test No. | Days Cured | Sample No. | Length (in.) | Force (lb) | Shear Bond (psi) | Average Shear Bond (psi) |
|---|---|---|---|---|---|---|
| PC-Mix-1 | 12 | 1 | 4 | 180 | 9.6 | 12.0 |
|  |  | 2 | 4 | 100 | 5.3 |  |
|  |  | 3 | 4 | 400 | 21.2 |  |
| PC-Mix-2 | 9 | 1 | 4 | 300 | 16.2 | 24.7 |
|  |  | 2 | 4 | 380 | 20.2 |  |
|  |  | 3 | 4 | 700 | 37.8 |  |
| PC-Mix-3 | 19 | 1 | 4 | 900 | 47.7 | 54.8 |
|  |  | 2 | 4 | 1,200 | 63.6 |  |
|  |  | 3 | 4 | 1,000 | 53.0 |  |

1.5-in. OD pipe inside 2.5-in. ID sleeve; curing temperature - 200° F.

The interfaces (casing or formation, depending on the area of shear failure) tested along with their corresponding shear bond data for the sections of all three tests are listed in Table 9. The average bonding measured at the casing as 26, 15, and 33 psi for the PC-Mix-1, -2, and -3 tests, respectively. Higher average shear bond values of 70, 51, and 72 psi were recorded at the formation interfaces of PC-Mix-1, -2, and -3, respectively.

TABLE 9

SHEAR BOND TEST DATA OBTAINED USING TEST SECTIONS

| Test No. | Section No. | Length (in.) | Force (lb.) | Shear Bond (psi) | Interface Sheared |
|---|---|---|---|---|---|
| PCMix-1 | 2A | 10.0 | 3,480 | 22 | Casing |
|  | 2B | 9.75 | 17,200 | 86 | Formation |
|  | 3A | 9.875 | 1,000 | 50 | Formation |
|  | 3B | 10.0 | 14,750 | 72 | Formation |
|  | 4A | 9.5 | 4,500 | 30 | Casing |
|  | 4B | 10.5 | 4,000 | 24 | Casing |
| Casing average - 26 psi; formation average - 70 psi | | | | | |
| PC-Mix-2 | 2A | 9.75 | 300 | 2 | Casing |
|  | 2B | 9.75 | 13,200 | 66 | Formation |
|  | 3A | 9.75 | 3,800 | 25 | Casing |
|  | 3B | 10.0 | 8,900 | 43 | Formation |
|  | 4A | 9.875 | 2,800 | 18 | Casing |
|  | 4B | 1.75 | 8,600 | 43 | Formation |
| Casing average - 15 psi; formation average - 51 psi | | | | | |
| PC-Mix-3 | 1 | 9.75 | 3,000 | 20 | Casing |
|  | 2A | 9.875 | 3,600 | 23 | Casing |
|  | 2R | 7.5 | 14,200 | 72 | Formation |
|  | 3A | 9.75 | 7,500 | 48 | Casing |
|  | 3B | 10.0 | 15,700 | 77 | Formation |
|  | 4A | 9.5 | 6,100 | 41 | Casing |
|  | 4B | 9.5 | 13,000 | 67 | Formation |
| Casing average - 33 psi; formation average - 72 psi | | | | | |

These increased shear bond values at the formation interfaces can be attributed to the dehydrated and compacted nature of the PC-Mix filter cakes. The hardened filter cake of PC-Mix-1 had a compressive strength of 2,500 psi. In fact, in many cases, the shear failures recorded during formation interface testing were a result of the compressive failure (cracking) of the man-made sandstone (simulated formation of the test model) and thus were lower in value than would be measured if additional formation integrity were present. The bond between the hardened C-Mix and the filter cake was so strong that it was not broken during testing or by hitting the core with a hammer. This clearly demonstrates that improved zonal isolation can be achieved through a set-filter cake with improved bonding to the formation.

Circulation Tests Results

In each case, large volumes of the universal fluids used in the tests were treated with additional dispersant (chrome lignosulfonate) and noted as "fully-treated" PC-Mix. Eighty-gallon batches were treated in PC-Mix-1 and -2, while only 20 gallons were used in PC-Mix-3 due to volume storage limitations. These volumes were then circulated for periods ranging from 36 to 56 days to demonstrate the ability to use these fluids as drilling fluids for long periods with compressive strength development still being possible under static conditions.

increased the density of PC-Mix-2 from 11.1 to 11.6 lb/gal. The fluid properties of Pc-Mix-2 were soon stabilized after addition of the cement, and it ran about one month. The life of PC-Mix-3 was about three weeks.

Type IV Universal Fluid Displacement Tests

Two test models with a 4.96-in. OD (4.04 in. ID) Star 2500 fiber glass (FG) casing (18-ft long) and one test model with a traditional 5-in. OD, 18-ft long steel casing were used. An electrically heated oil bath surrounded the test section. For safety, the electrical heater was turned off during the non-office hour periods. The selected test temperatures were as follows:

Circulating—120° F.

Curing Period—140° F., 180° F.

Three full-scale tests were conducted based on the matrix as shown in Table 10.

TABLE 10

TEST MATRIX FOR TYPE IV UNIVERSAL FLUIDS

| Code | UF Composition | HTC-Mix Concentration | Test Model/Features |
|---|---|---|---|
| UF-4 | 40 ppb slag<br>8 ppb "UNICAL CF"* | 225 ppb | Vertical-1<br>Fiber Glass |
| UF-5 | 80 ppb slag<br>10 ppb "UNICAL CF" | 225 ppb | Vertical-2<br>Steel Casing |
| UF-6 | 60 ppb slag<br>8 ppb "UNICAL CF" | 225 ppb + | Horizontal<br>10 ppb Hematite<br>Fiber Glass<br>For Settling and<br>Free Oil/Water |

"UNICAL CF" is chrome free lignosulfonate made by Michem.

Mud Preparation

A batch of 60 barrels of 9.1 ppg SPM (Shell polymer mud) mud was prepared using the following formulation:

| | |
|---|---|
| Water | 0.94 bbl |
| Bentonite | 12 lbs (Prehydrated) |
| KCL | 13.15 lbs (4% bwow) |
| [1]"XC" | 0.5 lb |
| [2]"NEWDRILL" (liquid) | 0.1 gal |
| [3]Drispac Superlo | 0.25 lb |
| RevDust | 35 lbs |

[1]"XC" is xanthan gum made by Kelco.
[2]"NEWDRILL" is partially hydrolized polyacrylamide made by Milchem.
[3]"DRISPAC SUPERLO" is carboxymethylcellulose made by Drilling Specialties.
"REVDUST" is simulated drill solids made by Milwhite.

Plastic viscosity and yield point of the universal fluids over time, were monitored daily for more than 30 days. The fluids maintained excellent rheological properties for a long period of time. PC-Mix-1 circulated for more than six weeks. PC-Mix-2 had to be treated with 39 lb/bbl of Class A cement to minimize solids settling in the tank, which The mud was conditioned until mud properties had been stabilized. It was then treated with 1.5 volume percent heavy crude oil in order to simulate the field mud used to drill through the oil bearing Tulare/Diatomite formations. The mud properties before and after adding oil are summarized in Table 11.

TABLE 11

REPRESENTATIVE UF FLUID PROPERTIES MONITORED DURING A FULL-SCALE CIRCULATION TEST

| Date | Fluid Type | Total Slag (lb/bbl) | Total RevDust (lb/bbl) | PV (cp) | Yield Point (lb/100 ft$^2$) | 10 sec/10 min Gels | pH | API FL (ml) | Slurry Density (lb/gal) |
|---|---|---|---|---|---|---|---|---|---|
| 6/29 | SPM | 0 | 35 | 17 | 87 | 65/132 | 7.25 | 14.0 | 9.0 |
| 6/30 | SPM* | 0 | 35 | 15 | 85 | 50/110 | 7.30 | 13.7 | 9.0 |
| 7/2 | UF-4 | 40 | 35 | 24 | 8 | 4/18 | 8.93 | 11.6 | 9.8 |
| 7/10 | UF-4 | 40 | 35 | 18 | 8 | 3/20 | 8.53 | 12.8 | 9.8 |

TABLE 11-continued

REPRESENTATIVE UF FLUID PROPERTIES MONITORED DURING
A FULL-SCALE CIRCULATION TEST

| Date | Fluid Type | Total Slag (lb/bbl) | Total RevDust (lb/bbl) | PV (cp) | Yield Point (lb/100 ft$^2$) | 10 sec/10 min Gels | pH | API FL (ml) | Slurry Density (lb/gal) |
|---|---|---|---|---|---|---|---|---|---|
| 7/10 | UF-6 | 60 | 35 | 20 | 8 | 6/46 | 10.2 | 16.0 | 10.0 |
| 7/31 | UF-6 | 60 | 35 | 22 | 12 | 10/51 | 10.2 | 18.0 | 10.1 |
| 7/31 | UF-6 | 60 | 85 | 25 | 28 | 25/123 | 10.0 | 20.0 | 10.5 |
| 8/7 | UF-6 (Add 1 lb/bbl KOH) | 60 | 85 | 41 | 42 | 53/115 | 10.0 | 23.0 | 10. |
| 8/17 | UF-6B | 60 | 85 | 36 | 24 | 28/120 | 11.4 | 26.0 | 10.5 |
| 8/13 | UF-6B | 60 | 85 | 72 | 46 | 36/107 | 10.5 | 28.0 | 10.5 |
| 8/13 | UF-6C | 80 | 85 | 54 | 58 | 48/64+ | 10.4 | 34.0 | 11.1 |
| 8/15 | UF-6C (Add 6 lb/bbl Na$_2$CO$_3$) | 80 | 85 | 82 | 64 | 58/80+ | 10.5 | 34.0 | 11.1 |
| 8/15 | UF-6D | 80 | 85 | 42 | 4 | 3/35 | 11.5 | 14.0 | 11.2 |
| 8/16 | UF-6D | 80 | 85 | 47 | 5 | 4/25 | 11.5 | 14.0 | 11.2 |
| 8/16 | UF-6E | 100 | 85 | 35 | 9 | 7/70 | 11.5 | 13.6 | 11.6 |
| 8/20 | UF-6F (Add 2.5 lb/bbl KOH) | 100 | 105 | 65 | 28 | 47/165 | 11.2 | 16.0 | 12.1 |
| 8/21 | | | | | | | | | |
| 8/21 | UF-6G (Fluid gelling fast, discarded) | 100 | 105 | 168 | 127 | 110/160 | 12.1 | 18.0 | 12.1 |

*1.5% crude oil was added.

Filter Cake Deposition

UF-4 (40 lb/bbl) Slag was prepared by adding 40 lb/bbl Colton ground slag and 8 lb/bbl of Unical CF to the 60-barrel batch of base mud. The slurry properties of UF-4 and subsequent UF's are listed in Table 11. UF-4 was circulated through the water saturated core for 27 minutes at 2 barrels per minute (BPM). Then the model was shut in at 120° F. bottom hole circulation temperature (BHCT) for overnight.

UF-5 (80 lb/bbl Slag) was prepared by isolating a 5-barrel batch of UF-4 in a small mixing tank and treating it with an additional 40 lb/bbl slag and 2 lb/bbl of Unical CF (for a total of 10 lb/bbl). UF-5 was conditioned, and the rheological properties were recorded.

Using the remainder of UF-4, UF-6 (60 lb/bbl Slag) was prepared by adding 20 lb/bbl slag to the mud tank. UF-6 was conditioned and the rheological properties were recorded.

Displacement Test Results

After aging overnight, circulation was reinitiated for UF-4 for 27 minutes at 2 BPM while collecting additional filtrate. During circulation, a 5-bbl batch of isolated UF-4 was converted to a 225 lb/bbl HTC-Mix and dyed with 12.5 lb/bbl red iron oxide (this amount of iron oxide was later judged to be excessive).

The same procedure was used for both UF-5 and UF-6. They were both dyed with 2.5 lb/bbl red iron oxide. UF-6 was treated with 10 lb/bbl "HIDENSE" (hematite from Halliburton) to simulate the settling solids in a horizontal hole.

The amounts of the ingredients added during the tests are shown in Table 12.

TABLE 12

COMPOSITIONS FOR
PREPARING HTC-MIXs FROM UF-4, UF-5, AND UF-6

| C-57 Composition | Percent | UF-4 FG | UF-5 Steel | UF-6 FG |
|---|---|---|---|---|
| Class A Cement | 33% | 74.25 | 74.25 | 74.25 |
| [1]"SS-C200" | 17% | 38.25 | 38.25 | 38.25 |
| [2]"POZMIX A" | 14% | 31.5 | 31.5 | 31.5 |
| [3]"K-35" (Na$_2$CO$_3$) | 3% | 6.75 | 6.75 | 6.75 |
| "COLTON" Slag | 33% | 34.25 | — | 14.25 |
| (Slag Contained in UF) | | (40) | (80) | (60) |
| Total HTC-Mix | 100% | 225 | 225 | 225 |
| lb/bbl | | lb/bbl | lb/bbl | |

[1]"SS-C200" is sodium silcate made by PQ Corporation.
[2]"POZMIX A" is flyash supplied by Halliburton.
[3]"K-35" is sodium carbonate supplied by Halliburton.
"COLTON" Slag is slag supplied by California Portland Cement Company.

UF-4 was displaced with the dyed UF-4 HTC-Mix at 2 BPM until uncontaminated HTC-Mix was noted at the discharge. The C-Mix slurry was circulated through the model at 2 BPM for 27 minutes. Essentially the same procedure was followed in the cases of UF-5 and UF-6.

All three test models were heated to 140° F. and kept at that temperature until midnight of the first day of the test. On each following week-day the test model was heated only from 8 a.m. to 9 p.m.

For each test, two small shear bond models, three 2-in. cube molds, and one UCA cell were each filled with a sample of the HTC-Mix slurry. All samples were cured at 140° F. until the corresponding model was logged. These samples provided valuable data regarding the quality of these full-scale HTC-Mix slurries. Compressive strength and shear bond test results along with the rheological properties of the three UF's are summarized in Table 13.

TABLE 13

SUMMARY OF RHEOLOGICAL PROPERTIES AND SET HTC-MIX PROPERTIES OF UF-4, UF-5, AND UF-6

| | Additives | | | Rheological Properties | | | | | Set Properties | | | |
|---|---|---|---|---|---|---|---|---|---|---|---|---|
| C-Mix Test No. | Red Iron Oxide (lb/bbl) | Hydense (lb/bbl) | C-Mix (lb/bbl) | PV (cp) | YP (lb/100 ft$^2$) | Gels | pH | Density (lb/gal) | Cube Strength (psi) | UCA Plot (psi) | UCA Crushed (psi) | Shear Bond Mold (psi) |
| UF-4 | 12.5 | 0 | 225 | 70 | 28 | 29/270 | 11.9 | 12.1 | 2063 | 1447 | 1752 | 61 |
| UF-5 | 2.5 | 0 | 225 | 48 | 21 | 6/61 | 12.2 | 12.2 | 1938 | 1451 | 1885 | 96 |
| UF-6 | 2.5 | 10 | 225 | 35 | 17 | 6/38 | 12.0 | 12.1 | 2175 | 1358 | — | 202 |

The data in Table 13 represent the flow and set properties of the HTC-Mix slurries converted from these UFs. The UF-4 10-second and 10-minutes gel strengths seem to be rather high (29/270 lb/100 ft$^2$), but this is believed to result from the 12.5 lb/bbl red iron oxide added to dye the fluid. This amount was reduced to 2.5 lb/bbl for UF-5 and UF-6. Compressive strengths and shear bond strengths are excellent.

The top plug was then launched, and a 100-psi pressure was applied. The wellbore temperature was raised to 140° F. and maintained at 140° F. based on the schedule mentioned above. After heating the model for 76 hours, the temperature was raised to 180° F. for Test models V-2 (UF-5) and H-1 (UF-6) to insure that the filter cakes would set hard. Actual total heating temperatures and times of the three full-scale test models are as follows:

UF-4—113 hours/140° F.

UF-5—76 hours/140° F. plus 76 hours/180° F.

UF-6—76 hours/140° F. plus 63 hours/180° F.

Universal Fluid Circulation Test Results

In conjunction with the full-scale displacement tests the same universal fluids were used in long term circulation tests to check universal fluids stability for use as a drilling fluid.

The circulation flow loop had two 40 barrel tanks (each with two Lightnin mixers) and external piping with a centrifugal pump and an in-line high shear device. The universal fluids were normally circulated through the loop for 2 hours each morning and 2 hours each afternoon on week days. The maximum fluid temperature was not allowed to exceed 120° F. The Lightnin mixers were run continuously to preclude any settling in the tanks.

UF-4 was circulated through a flow loop consisting of two 40-barrel tanks. Upon completing the three full-scale tests, only one tank with an external circulation loop was utilized. By this time the volume had been reduced to about 30 barrels so that two tanks were not needed.

Rheological properties, API fluid loss, pH, and fluid density were measured daily. These data and the various material additions are given in Table 11.

The 9.0 lb/gal SPM base mud was mixed on Day 0 and stabilized.

On Day 3 it was converted to UF-4 (9.8 lb/gal) by adding 40 lb/bbl slag and 8 lb/bbl Unical CF. Excellent fluid properties were maintained for 8 days of continued circulation.

On Day 11 the UF-4 was then converted to UF-6 (10.0 lb/gal) by adding an additional 20 lb/bbl slag. The excellent fluid properties remained for 3 more weeks.

To show the effect of drill solids increase with continued drilling, 20 lb/bbl more RevDust (native clay) was added on Day 32 to make UF-6A (10.5 lb/gal). The plastic viscosity and API fluid loss increased moderately but the yield point and gel strengths increased drastically.

When 1 lb/bbl KOH was added on Day 39, the plastic viscosity continued to increase (possibly due to the further shearing of the previously added RevDust) while the yield point and gel strengths decreased somewhat.

On Day 45 a further addition of 20 lb/bbl slag to give UF-6C (11.1 lb/gal) resulted in a slight increase in all the functions except the 10-minute gel strength which remained approximately constant.

Six lb/bbl soda ash was added on Day 47 and this UF-6D (11.2 lb/gal) again became an excellent drilling fluid.

Further solids additions were made (20 lb/bbl slag on Day 49, and 20 lb/bbl RevDust on Day 52) with the expected increases of rheological properties and filtration rate. At this time, UF-6 contained a total of 175 lb/bbl solids.

Finally, 2.5 lb/bbl more KOH was added on Day 53 and the rheological properties increased greatly. Estimated rheological properties include a plastic viscosity of 168 cp, a yield point of 127 lb/100 ft$^2$ and a 10-min. gel strength of 160+ lb/100 ft$^2$. The entire test was terminated while the tank could still be flushed out.

In summary, this circulation experiment confirmed that a universal fluid can be circulated and controlled for an extended period as a stable drilling fluid. A universal fluid can tolerate substantial solids build-up while maintaining reasonable rheological properties.

Laboratory "Disposable Core Filtration" Test Procedures

Disposable core filtration (DCF) tests were conducted using high temperature mud aging cells. They have been very useful and unique in terms of allowing quality filter cakes to be built (on a Berea sandstone specimen) which yield excellent shear bond data. They provide visual evidence of hardened filter cake and set HTC-Mix or S-Mix, and allow determination of the compressive strength of various layers and the shear bond strength of the universal fluid filter cake.

DCF tests were conducted in order to investigate DCF bond quality. A sample of UF-6 fluid collected from the full-scale displacement tests was used. First, the effects of various mud additives were investigated. Table 14 summarizes various mud formulations and the DCF test results. Test Nos. 55, 59, and 60 used the UF-6 (collected from the full-scale test fluid). Other tests used laboratory muds with various formulations.

All the DCF cores had very good bonds ranging between 150 psi and 740 psi. All the universal fluid and HTC-Mix filter cakes, and set HTC-Mix had excellent compressive strengths.

TABLE 14

DISPOSABLE CORE FILTRATION TEST RESULTS OF UF-6 WITH VARYING MUD COMPOSITIONS

| UF Type | 55 UF-6* | 56 Lab | 57 Lab | 58 Lab | 59 UF-6* | 61 Lab | 62 Lab | 63 Lab | 64 Lab |
|---|---|---|---|---|---|---|---|---|---|
| Mud Composition | | | | | | | | | |
| "KCl", % | 4 | 4 | 4 | 4 | 4 | 4 | 0 | 0 | 0 |
| "XC"(lb, bbl) | 0.5 | 1.0 | 0 | 1.0 | 0.5 | 0.5 | 0.5 | 0 | 0.5 |
| "NEWDRILL", (lb/bbl) | 1.1 | 1.1 | 1.1 | 0 | 1.1 | 0 | 1.1 | 1.1 | 1.1 |
| "UNICAL CF" | 8 | 8 | 8 | 8 | 8 | 6 | 6 | 6 | 4 |
| Time to Filter 20 ml, min. | 17.3 | 22.4 | 8.3 | 23.3 | 18.3 | 3.3 | 40.5 | 27.3 | 21.0 |
| Cake Thickness, 32nd, in. | 3 | 4 | 55 | 4 | 3.5 | 5 | 3 | 3 | 3 |
| HTC-Mix, 225 lb/bbl | | | | | | | | | |
| Total Unical CF, lb/bbl | 12 | 12 | 12 | 12 | 12 | 10 | 11 | 10 | 8 |
| Curing @ 140° F., (days) | 4.9 | 4.9 | 4.9 | 4.9 | 7.0 | 4.7 | 4.7 | 4.7 | 4.7 |
| Set Properties, psi | | | | | | | | | |
| UF Filter Cake | 2310 | 2500 | 2180 | 2420 | 2400 | 1540 | 3630 | 3430 | 2900 |
| HTC-Mix Filter Cake | 2540 | 2860 | 2620 | 2680 | 2410 | 2730 | 3260 | 3630 | 3760 |
| HTC-Mix | 1410 | 1760 | 1870 | 1840 | 1730 | 2130 | 2110 | 2090 | 1810 |
| Shear Strength | | | | | | | | | |
| -Up | 420 | 360 | 360 | 630 | 440 | 270 | 170 | 740 | 630 |
| -Bottom | 330 | 420 | 490 | 570 | 660 | 150 | 200 | 570 | 580 |

*UF-6 sample from the full-scale test.

Type IV Universal Fluid Field Tests

Two Diatomite wells (514L-29 and 568E-33) located in the Belridge Field, Calif., were drilled with a Type IV universal fluid and cemented with S-Mix mud-cement slurries.

A total of 700 barrels of the universal fluid was prepared by adding 60 lb/bbl Colton slag to an unweighted "PETRODRILL" (PHPA, partially hydrolyzed polyacrylamide from Unibar) mud at a nearby mud plant for both wells as follows:

| | |
|---|---|
| Bentonite (prehydrated): | 10.0 lb/bbl |
| "CYPAN": | 1.0 lb/bbl |
| [1]"DRISPAC RV": | 0.5 lb/bbl |
| [2]"PETRODRILL" (liquid): | 1.1 lb/bbl |
| Colton Ground Slag: | 60.0 lb/bbl |

[1]"DRISPAC RV" is carboxymethylcellulose made by Drilling Specialties.
[2]"PETRODRILL" is partially hydrolyzed polyacrylamide made by Unibar.

The universal fluid had a density of 9.35 lb/gal, a pH of 11.7 and the following rheology:

| | |
|---|---|
| Plastic Viscosity, cp: | 17 |
| Yield Point, lb/100 ft$^2$: | 7 |
| 10-sec. Gel, lb/100 ft$^2$: | 1 |
| 10-min. Gel, lb/100 ft$^2$: | 6 |

On the first well the universal fluid was treated at the beginning with the equivalent of 1 lb/bbl "SUPERTHIN" (liquid, low molecular weight polyacrylate mud thinner from UniBar) on the assumption that it would be needed to prevent the universal fluid from setting while the well was being drilled and also to serve as a thinner. It turned out that "SUPERTHIN" thinned the universal fluid too much and dispersed drilled cuttings. The, soft, sticky cuttings were more of a problem on the first well than on the second well. "SUPERTHIN" was discontinued and viscosity was controlled with additions of water and slag to maintain slag concentration and chemically with "CYPAN" (high molecular weight polyacrylate fluid loss additive from American Cyanamid), which is an effective thinner in unweighted, nondispersed systems.

The rheology of the universal fluid on the second well was controlled using only "Cypan". Dispersion of cuttings was minimized since no SuperThin was added during drilling. The rheological properties of the universal fluid monitored for both wells are summarized as follows:

| | Well 514L-29 | Well 568E-33 |
|---|---|---|
| Fluid Density | 9.3–9.5 | 9.4–9.8 |
| Plastic Viscosity | 16–42 | 24 |
| Yield Point | 1–17 | 11 |
| 10-min. Gel | 1–24 | 4 |
| API Fluid Loss, ml | 9.0 | 9.0 |

At the conclusion of drilling, the spent universal fluid was then converted to an S-Mix mud-cement system by adding an additional 165 lb/bbl slag and 2 lb/bbl "MILTEMP" ("SSMA", sulfonatedstyrene maleic anhydride polymer from Milpark) for both wells. The resulting 11.8 lb/gal S-Mix slurry had excellent rheological properties and set properties.

Both drilling and cementing operations were performed without any major problems. Caliper logs indicate that the wellbores were gage although returning cuttings were very soft. Evaluation of the S-Mix cementing jobs by "CET" (cement evaluation tool by Schlumberger) was very good.

Conclusions from the Above Testing of Universal Fluids

As above described, the universal fluid is prepared by treating a mud with a certain amount of a hydraulic material, e.g., Portland cement, blast furnace slag, and other hydraulic ingredients. The universal fluid then acts as a drilling fluid and deposits a settable filter cake while drilling under downhole conditions. This universal fluid can then be converted to a C-Mix, HTC-Mix or S-Mix fluid by adding more hydraulic material and an activator(s) to allow it to set into a high-strength mud concrete at the end of drilling.

The above testing supports the conclusion that a universal fluid is quite versatile depending upon the well conditions and the desired results. The major benefits and applications of a universal fluid are indicated by the data and inspection of specimens to be as follows: (1) with a universal fluid, a settable filter cake will be deposited all around in the borehole during drilling as long as the formation is permeable; both the filter cake and the universal fluid converted into a C-Mix, HTC-Mix or S-Mix will set under downhole conditions; (2) a universal fluid is designed to cement the very narrow annular spaces on the bottom of highly deviated, horizontal, or extended reach holes and thus achieve good zonal isolation, thereby providing a settable filter cake; (3) conversion of a normal drilling fluid to a universal fluid may begin at the top of a critical portion of the wellbore, e.g., a casing point, or the top of the objective section, or wherever good zonal isolation is required; (4) neither displacement of the mud nor removal of the mud filter cake is needed if a universal fluid is used to drill a well; (5) in a weak or unconsolidated formation, a universal fluid may be used to protect the casing by enhancing the strength of the borehole, to enhance the mechanical strength of the borehole, or to repair the borehole prior to cementing by providing a high-strength universal fluid filter cake; (6) as a low density drilling/cement fluid, a universal fluid may also be used to control lost circulation problems; (7) a universal fluid is very inexpensive because it utilizes the drilling mud used in the well, which must be disposed of, in any event, at a cost; and it also reduces the volume of mud that still must be disposed in the end.

What is claimed is:

1. A method for drilling and cementing a well comprising, preparing a universal fluid by admixing a well fluid or drilling mud with Portland cement and pozzolan;

drilling a borehole with the universal fluid and laying down a settable filter cake on the walls of said borehole during drilling of the well; and activating the filter cake to harden and set up.

2. The method of claim 1 wherein the filter cake is activated with sodium silicate.

3. A method for drilling and cementing a well comprising, preparing a universal fluid by admixing a well fluid or drilling mud with Portland cement and blast furnace slag and pozzolan; drilling a borehole with drilling a borehole with the universal fluid and laying down a settable filter cake on the walls of said borehole during drilling of the well; and activating the filter cake to harden and set up.

4. The method of claim 3 wherein the filter cake is activated with sodium silicate or alkalies.

5. A method for drilling and cementing a well comprising, preparing a universal fluid by admixing a well fluid or drilling mud with Portland cement and blast furnace slag;

drilling a borehole with the universal fluid and laying down a settable filter cake on the walls of said borehole during drilling of the well; and activating the filter cake to harden and set up.

6. The method of claim 5 wherein the filter cake is activated with sodium silicate or alkalies.

7. A method for drilling and cementing a well comprising, preparing a universal fluid by admixing a well fluid or drilling mud with blast furnace slag;

drilling a borehole with the universal fluid and laying down a settable filter cake on the walls of said borehole during drilling of the well; and activating the filter cake to harden and set up.

8. The method of claim 7 wherein the filter cake is activated with sodium silicate, Portland cement or alkalies.

* * * * *